Nov. 14, 1967   K. WILFERT ET AL   3,352,600
VEHICLE ROOF

Filed Aug. 9, 1962   2 Sheets-Sheet 1

INVENTORS
KARL WILFERT
BELA BARÉNYI

Dicke + Craig

ATTORNEYS

Nov. 14, 1967  K. WILFERT ET AL  3,352,600
VEHICLE ROOF
Filed Aug. 9, 1962  2 Sheets-Sheet 2
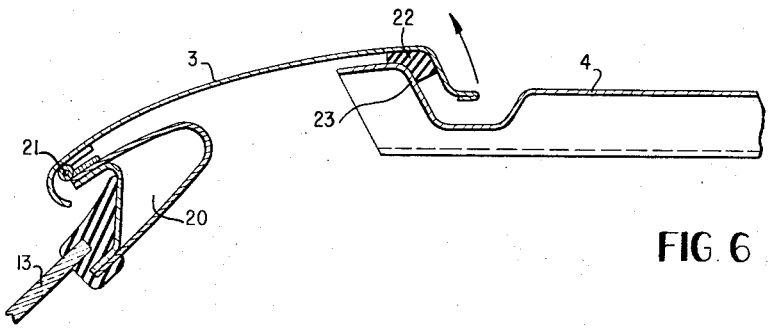
FIG. 6
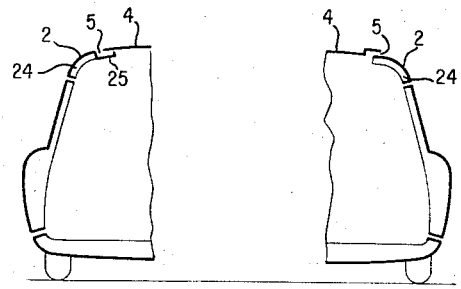
FIG. 7  FIG. 8
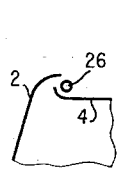 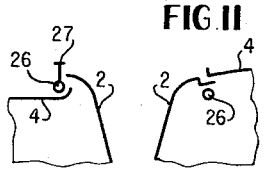 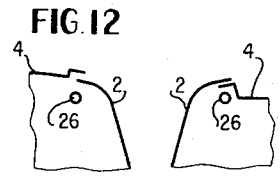 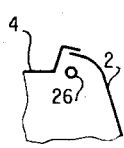
FIG. 9  FIG. 10  FIG. 11  FIG. 12  FIG. 13  FIG. 14
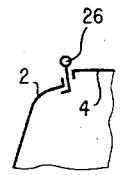 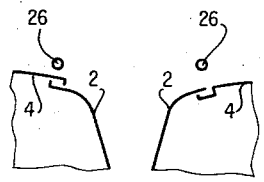 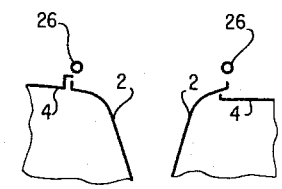 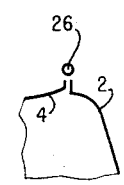
FIG. 15  FIG. 16  FIG. 17  FIG. 18  FIG. 19  FIG. 20
INVENTORS
KARL WILFERT
BELA BARÉNYI
Dicke + Craig
ATTORNEYS ent Office 3,352,600
Patented Nov. 14, 1967

3,352,600
VEHICLE ROOF
Karl Wilfert, Stuttgart-Degerloch, and Béla Barényi, Stuttgart-Vaihingen, Germany, assignors to Daimler-Benz Aktiengesellschaft, Stuttgart-Unterturkheim, Germany
Filed Aug. 9, 1962, Ser. No. 215,833
Claims priority, application Germany, Aug. 16, 1961, D 36,813
5 Claims. (Cl. 296—137)

The present invention relates to a motor vehicle roof provided with one or several movable roof parts, for example, slidable, hingedly swingable or completely removable roof parts, and essentially consists in the fact that at least one movable roof part inserted between lateral roof parts extends up to the front and/or rear edge of the roof.

The construction of roofs of this type is considerably simplified by such measures. In particular, the movable roof parts need no longer be made with such close tolerances because they have to be fitted only in width between the two laterally adjoining roof parts whereas they are displaceable or slidable in the longitudinal direction of the vehicle within certain limits and the front edge and/or the rear edge may protrude or be set back without difficulty with respect to the corresponding contour of the lateral roof parts without impairing the appearance of the vehicle.

According to a further feature of the present invention, the separating gaps or separating joints between the movable center roof part and the lateral roof parts may extend within the region of the inner flanks of the lateral roof bearer members. It is thereby particularly appropriate if the separating joints or gaps between the movable center roof part and the lateral roof parts extend over the entire length of the vehicle roof. The center section of the roof thus formed may then be composed of two or more individual parts which are separated from one another by a transverse joint or joints.

According to still a further feature of the present invention, the lateral roof parts may also be movable, especially may be hingedly connected or removable. Hinges may be arranged appropriately within the area of the separating joints. However, some individual roof parts or all of the roof parts may also be swingable about hinges which are disposed within the area of the roof edges.

It is advantageous both from the manufacturing viewpoint of the roof as well as for a good seal of the separating joints between the individual roof parts if the individual roof parts adjoin one another under formation of a step or by subtending an angle.

Accordingly, it is an object of the present invention to provide a roof construction made of several parts which entails great simplification in the manufacture and assembly of the roof.

Another object of the present invention resides in the provision of a roof construction made of a plurality of parts in which some of the parts are movable relative to one another and in which the requirements as regards close tolerances and accurate fitting are greatly reduced without impairing the appearance of the roof.

Still another object of the present invention is the provision of a roof construction made of several individual roof parts which facilitates the completely satisfactory sealing of the separating joints by simple and inexpensive means.

A still further object of the present invention resides in the provision of a roof construction made of several relatively movable roof parts in which the various roof parts adjoin one another in an advantageous manner either by effectively forming therebetween a step or by effectively subtending therebetween a predetermined angle.

A further object of the present invention resides in the provision of a roof construction for motor vehicles made of several relatively movable parts in which at least some of the parts require a certain degree of accuracy in the dimensioning thereof only along some of the edges thereof.

Still a further object of the present invention resides in the provision of a roof construction made of several roof parts in which neither the longitudinal dimensions nor the height thereof are critical notwithstanding a high degree of aesthetic appeal offered by the roof appearance.

Another object of the present invention resides in the provision of a multi-partite roof construction for motor vehicles which is not only simple in construction and easy to assemble and fit, but which may also be so constructed and arranged as to offer a high degree of rigidity and completely satisfactory sealing of the joints formed between the various relatively movable parts without expensive seal constructions.

These and other objects, features and advantages of the present invention will become more obvious from the following description when taken in connection with the accompanying drawing which shows, for purposes of illustration only, several embodiments in accordance with the present invention, and wherein—

FIGURE 6 is a partial longitudinal cross sectional view through the forward part of a modified embodiment of a roof in accordance with the present invention;

FIGURE 7 is a partial schematic transverse cross sectional view through the left half of a passenger motor vehicle provided with a further modified embodiment of a roof construction in accordance with the present invention;

FIGURE 8 is a partial schematic transverse cross sectional view through the right half of a passenger motor vehicle provided with still another modified embodiment of a roof construction in accordance with the present invention, and FIGURES 9 to 20 are partial schematic cross sectional views of different embodiments of roof constructions in accordance with the present invention, as seen in transverse cross section.

Figure 1:
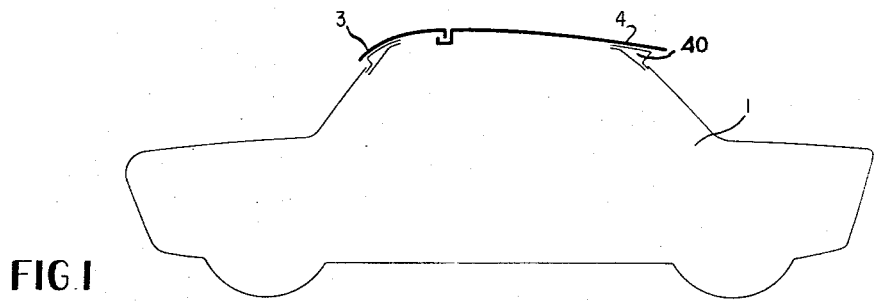
FIGURE 1 is a schematic longitudinal cross sectional view through a passenger motor vehicle provided with a roof in accordance with the present invention.

It is understood that in each case the opposite side of the different embodiments of the roof constructions such as illustrated in FIGURES 3, 4 and 7 through 20 of which only about one half is shown, are of mirror-image-like construction whereas the rear ends of the roof parts in the different embodiments of the roof constructions in accordance with the present invention may be of any suitable arrangement, and more particularly, may be fixedly, slidably, pivotally, or removably secured, for instance, at the structure forming a rear transverse roof bearer member 40 (FIG. 1).

Figure 2:
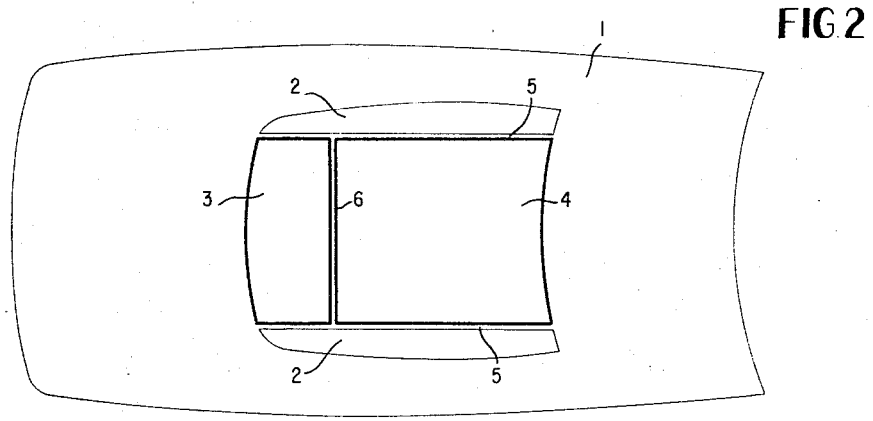
FIGURE 2 is a schematic plan view of the vehicle of FIGURE 1.

Referring now to the drawing wherein like reference numerals are used throughout the various views to designate like parts, and more particularly to FIGURES 1 and 2 thereof, reference numeral 1 designates therein a passenger motor vehicle provided with a roof composed of four parts, namely, of the two lateral roof parts 2 and of the two center roof parts 3 and 4. The two center roof parts 3 and 4 are separated from the lateral roof parts 2 by separating joints 5 which extend parallel to each other and extend over the entire length of the vehicle roof. A transverse separating joint 6 is provided between the center roof parts 3 and 4. The outer contours of the center roof parts 3 and 4 which extend up to the front and rear edges of the roof continue, in the illustrated embodiment, the contours of the lateral roof parts 2 in a smooth and steady manner. However, it is also within the purview and scope of the present invention to so construct the roof parts 3 and 4 that the outer contours thereof either protrude or are set back with respect to the contours of the lateral roof parts 2.

With the roof according to FIGURES 1 and 2, at least one of the two center roof parts 3 and 4 is constructed in a relatively movable manner and, for example, may be slidably displaced in the longitudinal direction of the vehicle 1, may be hinged and/or may be completely removed in any suitable conventional manner. However, in addition thereto, the two lateral roof parts 2 may be also arranged so as to be movable. For that purpose, hinges of any conventional construction may be provided for the outer roof parts 2, for example, within the area of the separating joints 5. However, within the scope of the present invention, the roof parts 2 may also, in lieu thereof, be swung about hinges which are arranged within the area of the outer edges of the roof. Of course, instead of or in addition thereto, it is also possible to construct the outer roof parts 2 so as to be completely removable by any suitable and appropriate known means.

A roof according to FIGURES 1 and 2 may be readily manufactured in a very simple manner because the center roof parts 3 and 4 need to be dimensioned accurately only with respect to the width thereof and have to be accurately fitted only within the area of the joints 5 between the cover panels of the lateral roof parts 2. The distance of parallel edges may be maintained with sufficient accuracy in a very simple and easy manner, especially if the joints are constructed in a step-shaped or angularly-shaped manner. Since the roof parts 3 and 4 extend up to the front edge and/or the rear edge of the vehicle top, the length thereof is by no means critical. This is especially true for the center roof parts 3 and 4, the forward and/or rear contours of which may protrude or be set back with respect to the contours of the lateral roof parts 2. Additionally, the roof parts 3 and 4 may also be displaced within certain limits in the longitudinal direction of the vehicle during assembly by reason of the parallelism of the joints 5 so that also the location of the separating joint 6 between the center roof parts 3 and 4 is not very critical.

Figure 3:
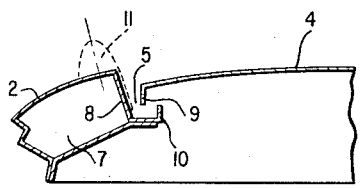
FIGURE 3 is a partial transverse cross sectional view through the left portion of a roof construction in accordance with the present invention.
Figure 4:
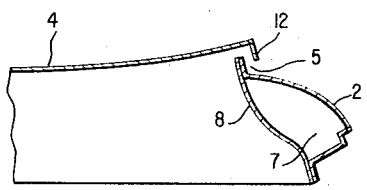
FIGURE 4 is a partial transverse cross sectional view through the right portion of a modified embodiment of a roof construction in accordance with the present invention.

FIGURES 3 and 4 illustrate, respectively, the left and right portion of different embodiments of roof constructions in transverse cross section in which the lateral roof parts 2 form the upper sheet metal panels of lateral roof bearers 7. The separating joints 5 between the lateral roof parts 2 and the center roof parts 4 extend thereby within the area of the inner flanks 8 of the lateral roof bearers 7.

In the embodiment according to FIGURE 3, the center roof part 4 is of slightly convex curvature and is provided with an angularly downwardly bent rim portion 9 which engages into a channel shaped profile 10 provided at the lower inner edge of the roof bearer 7. The roof part 4 is thereby so arranged that it comes to lie below the extension of the surface of the roof part 2 and forms an angle with the inner flank 8 of the roof bearer 7. The location of the center roof part 4 is therefore by no means critical also with respect to the height thereof whereby the manufacture of such a roof is further simplified. A rim ledge is indicated in dash line and designated by reference numeral 11 in this figure which may serve for purposes of securing auxiliary installations at the roof of the motor vehicle.

In the embodiment according to FIGURE 4, the roof which is of concave curvature and overlaps with the angularly bent rim portion 12 thereof the upper rim portion of the roof bearer 7 whereby this rim portion 12 again forms an angle with the outer roof part 2 so that also in this case neither the vertical position nor the width of the roof part 4 is particularly critical.

Figure 5:
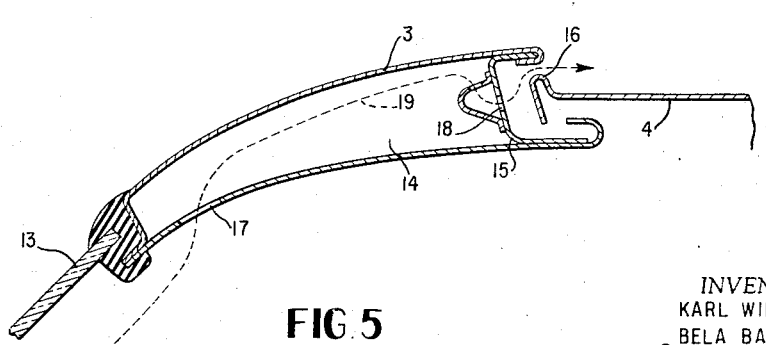
FIGURE 5 is a longitudinal cross sectional view through the forward part of a roof construction in accordance with the present invention.

In the embodiment according to FIGURE 5, the windshield 13 is adjoined by a hollow bearer 14 which may form part of an annularly-shaped roof bearer. The outer sheet metal member of this hollow bearer 14 forms the forward roof part 3. The hollow bearer 14 is closed off at the rear end thereof by means of a U-shaped profile member 15 open toward the rear thereof into which engages the forward rim portion of a movable center roof part 4. The movable roof part 4 may, for example, be so constructed and arranged as to be slidable toward the rear. The front rim portion of the roof part 4 is angularly bent hook-shaped in such a manner that an upwardly directed bulge 16 results. This bulge 16 in cooperation with the upper leg portion of the U-shaped profile member 15 extending above the same prevents any penetration of rain water or moisture into the joint between the cross bearer 14 and the forward edge of the roof part 4 without, however, requiring the presence of separate special seals. Apertures 17 and 18 are provided in the sheet metal members of the roof bearer 14 which apertures establish for purposes of ventilation a communication between the interior space of the vehicle and the atmosphere. The discharge aperture 18 for the air stream 19, indicated in dash line, is located within the cross web portion of the U-shaped profile member 15 and is protected by the rear edge of the center roof part 4 against penetration of moisture.

FIGURE 6 illustrates an embodiment in which a center roof part 3 adapted to be tilted in the forward direction is pivotally secured, by means of a hinge 21, at the rim of a bearer 20 extending above the windshield 13. The rear edge of the roof part 3 covers the front edge of another center roof part 4 which is also movable and which, for example, may be completely removed after forward tilting of the front roof part 3. A seal 22 is provided along the inside of the forward roof part 3 which comes into abutment with the upwardly bent rim 23 of the rear roof part 4.

Further embodiments for the construction of the roof parts in roofs according to the present invention are illustrated schematically in FIGURES 7 to 20. The motor vehicles according to FIGURES 7 and 8 are each provided with a lateral roof bearer 24 the outer sheet metal panels of which again constitute the outer lateral sheet-metal roof parts 2. The center roof parts 4 of both of these embodiments again overlap the edges of the outer roof parts 2 under formation of longitudinal gaps 5 and may be constructed and arranged so as to be slidable in the longitudinal direction of the vehicle, hingedly tiltable and/or completely removable.

In the embodiment according to FIGURE 7, the inner rim portion of the roof part 2 is constructed at 25 in a channel-shaped manner whereas in the embodiment according to FIGURE 8, the center roof part 4 extends over the outer roof part 4 under formation of a step.

In the embodiments according to FIGURES 9 to 20, longitudinal roof bearers 26 are schematically illustrated in each case by circles though the longitudinal bearer members, of course, may have different cross sectional profiles. The longitudinal bearers 26 may be disposed either on the outside or on the inside of the roof contour and may serve in each case for the support and connection of additional roof structures 27, as illustrated in connection with FIGURE 10. When the member 26 is provided within, i.e., at the inside of the vehicle as illustrated in FIGURES 11, 12, 13 and 14, it serves, for example, as a hand rail or the like, when the vehicle is being boarded, or for hanging thereon clothes and the like. Depending upon the construction of the roof, member 26 is then conveniently connected with the vehicle, generally with the vehicle superstructure and not with the displaceable roof. On the other hand, when member 26 is provided above the roof outside of the vehicle passenger space, as shown in FIGURES 9, 10 and 15 to 20, it serves as a baggage rack or as a rack for a roof which may be directly loaded and it is then again rigidly connected to preferably the vehicle superstructure. The illustrations of FIGURES 9 through 20 indicates schematically the loading possibilities of such a member. The transition from the movable center roof part 3 to the outer roof parts 2 may be realized in the various illustrated manners by corresponding construction of the rim portions of these roof parts. In particular, angularly-shaped transitions are illustrated in the embodiments according to FIGURES 9, 10, 16 and 18 whereas step-shaped transitions are illustrated in connection with the embodiments of FIGURES 12, 13, 14 and 19.

While we have shown and described several embodiments in accordance with the present invention, it is understood that the same is not limited thereto, but is susceptible of many changes and modifications within the spirit and scope thereof, and we therefore do not wish to be limited to the details shown and described herein, but intend to cover all such changes and modifications as are encompassed by the scope of the appended claims.

We claim:

1. A motor vehicle roof structure composed of a plurality of separate parts, at least one of said parts being relatively movable to some other parts, comprising two lateral roof parts, and at least one movable roof part inserted between said lateral roof parts and forming an intermediate portion of the terminal edge portion on one of the respective ends of the roof, said terminal edge portion further comprising edge portions on said two lateral roof parts disposed laterally of said intermediate portion.

2. A motor vehicle roof structure composed of a plurality of separate roof parts, comprising two lateral roof parts, and center roof panel means intermediate said two lateral roof parts including at least one relatively movable roof part inserted between said two lateral roof parts and forming an intermediate portion of the terminal edge portion of the respective end of the roof, and means to enable tilting movement of said one roof part relative to said two lateral roof parts, said terminal edge portion comprising edge portions on said two lateral roof parts disposed laterally of said intermediate portion.

3. The roof structure of claim 2, wherein said means to enable tilting movement is a hinge.

4. The roof structure of claim 2, wherein said terminal edge portion is the front terminal edge of the vehicle roof.

5. The roof structure of claim 3, wherein said terminal edge portion is the front terminal edge of the roof, and said hinge is closely adjacent to and generally parallel with said terminal edge portion.

References Cited

UNITED STATES PATENTS

| 2,122,712 | 7/1938 | Bishop | 296—137 |
| 2,132,228 | 10/1938 | Bishop | 296—137 |
| 2,596,903 | 5/1952 | Kropp | 296—137 X |
| 2,815,977 | 12/1957 | Podolan | 296—137 X |
| 3,015,519 | 1/1962 | Barenyi | 296—137 |
| 3,033,608 | 5/1962 | Golde | 296—137 |

FOREIGN PATENTS

| 134,463 | 8/1933 | Austria. |
| 1,312,334 | 11/1962 | France. |
| 460,134 | 1/1937 | Great Britain. |
| 689,041 | 3/1953 | Great Britain. |

BENJAMIN HERSH, *Primary Examiner.*

PHILLIP ARNOLD, *Examiner.*

P. W. WOHLFORTH, C. C. PARSONS,
*Assistant Examiners.*